Jan. 7, 1936. P. F. SCHAUM 2,026,850
CONTROL DEVICE FOR POWER LAUNDRY WASHERS
Filed June 24, 1932 4 Sheets-Sheet 1
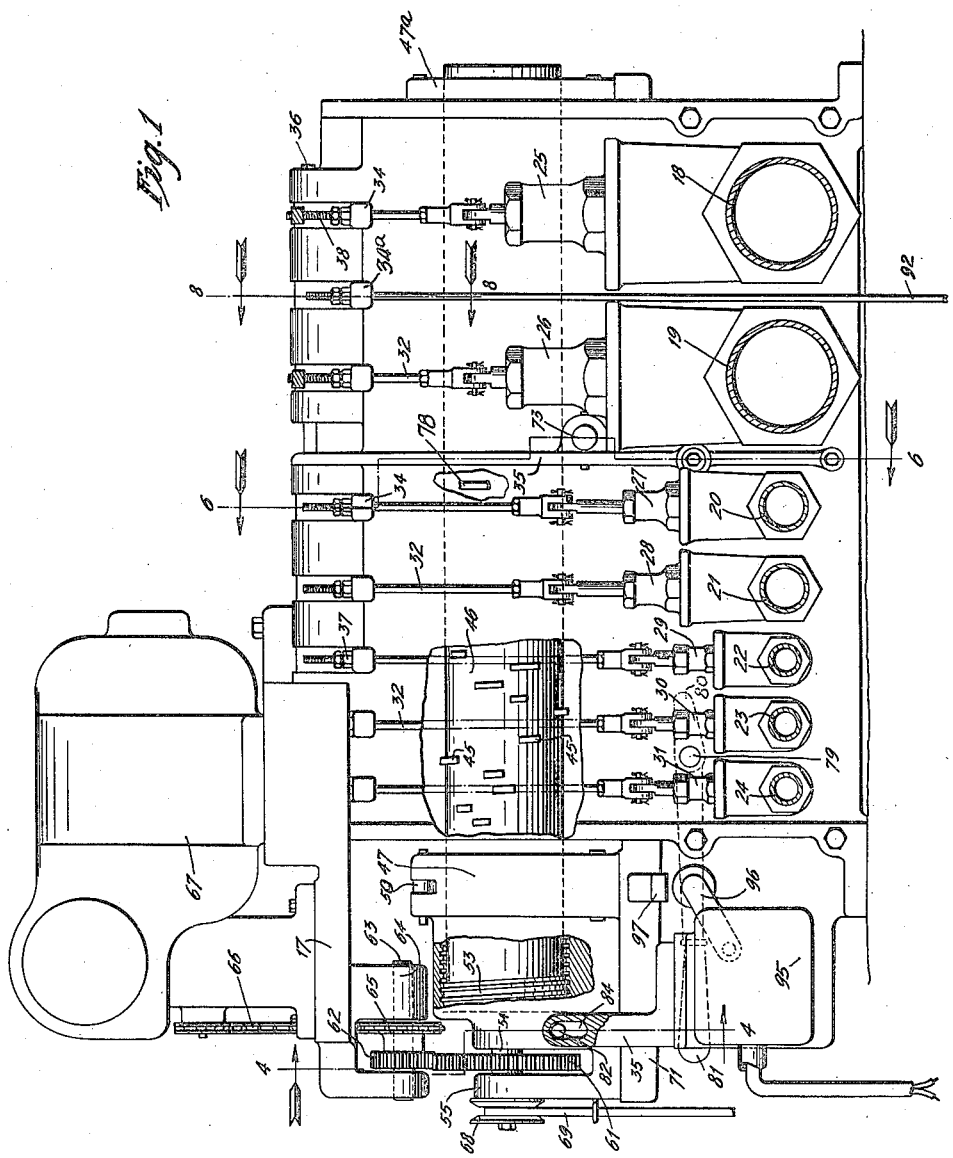
Inventor
Paul F. Schaum
by Ornig & Hague Attys.

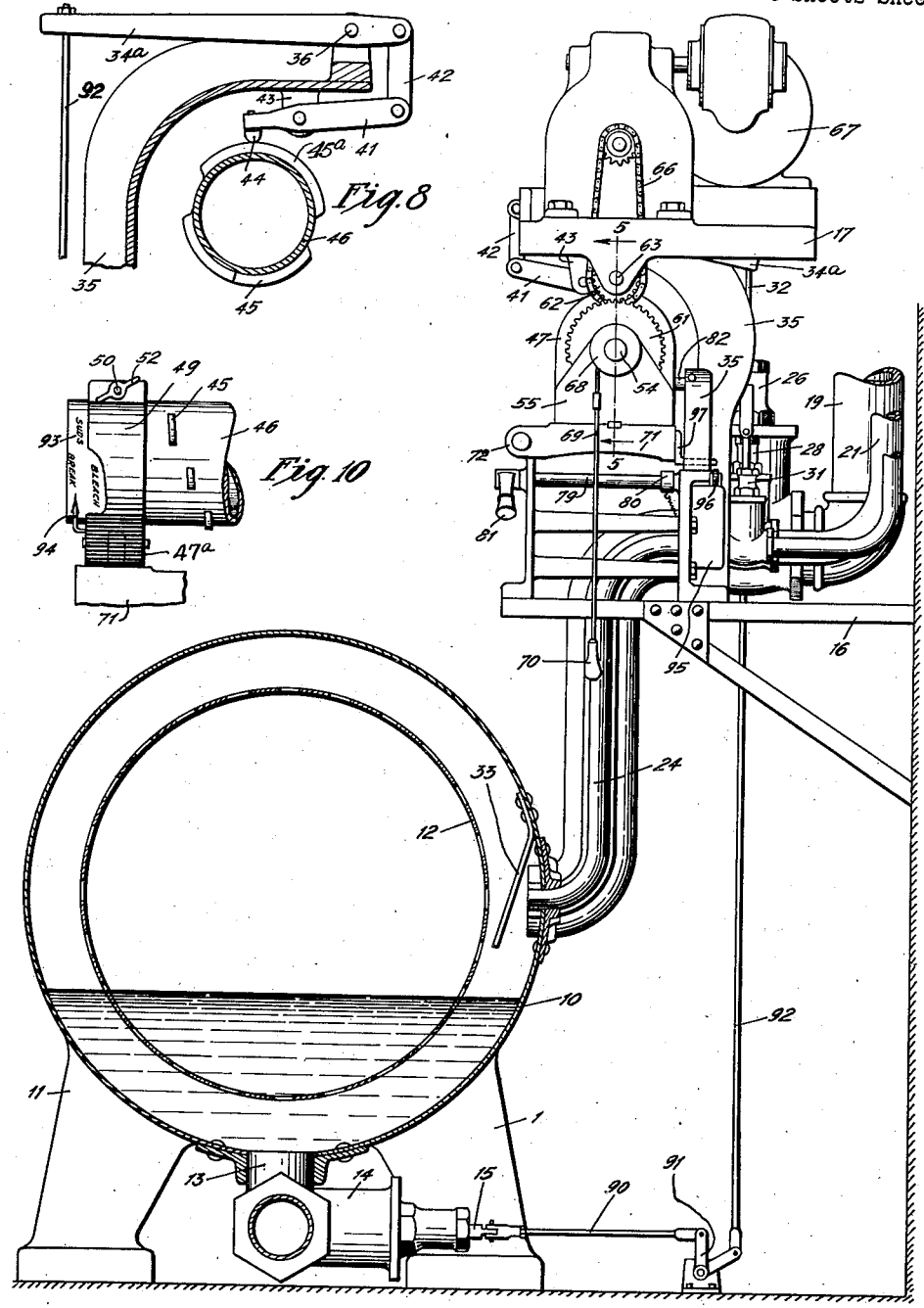

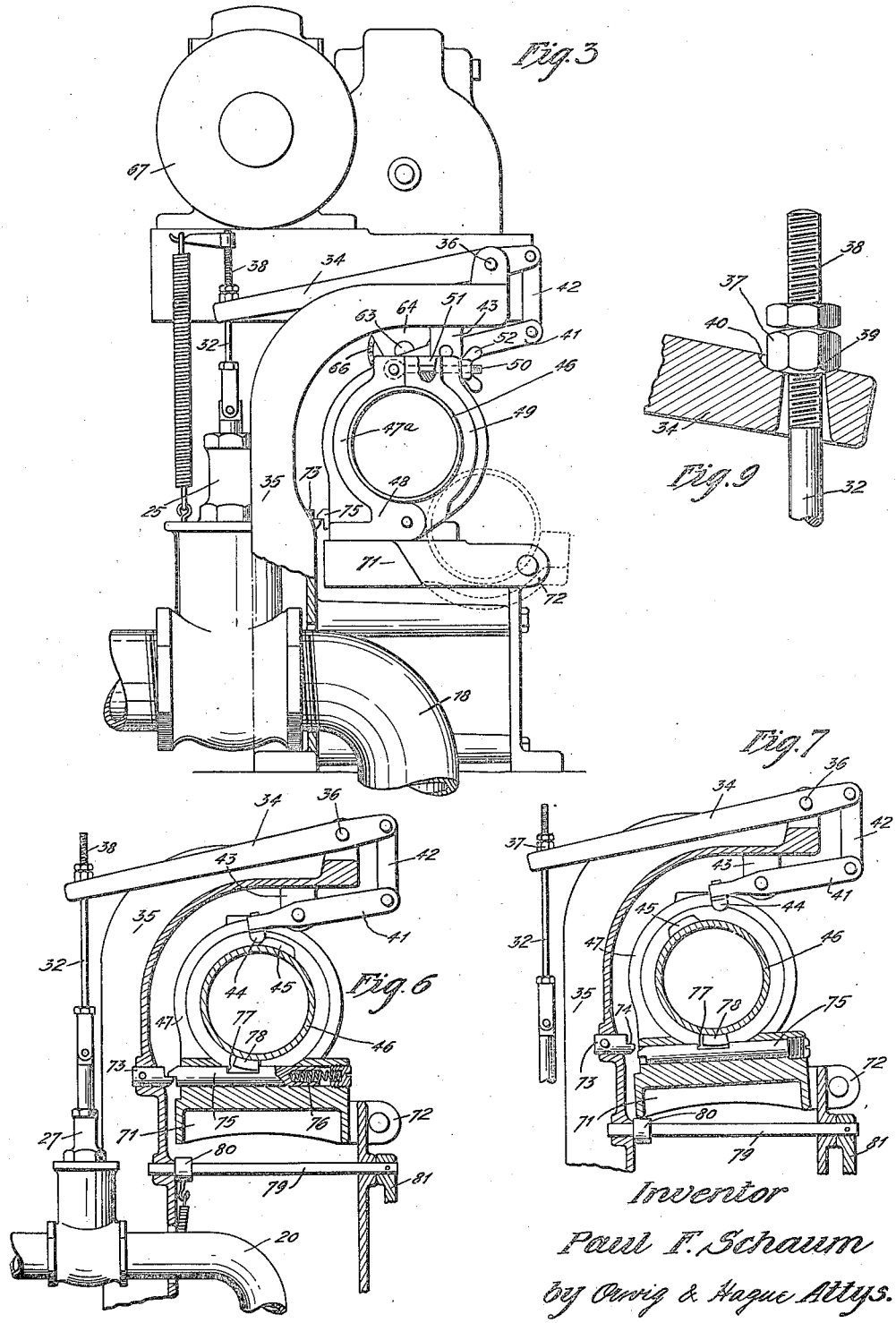

Jan. 7, 1936.　　　　P. F. SCHAUM　　　　2,026,850
CONTROL DEVICE FOR POWER LAUNDRY WASHERS
Filed June 24, 1932　　　　4 Sheets-Sheet 4
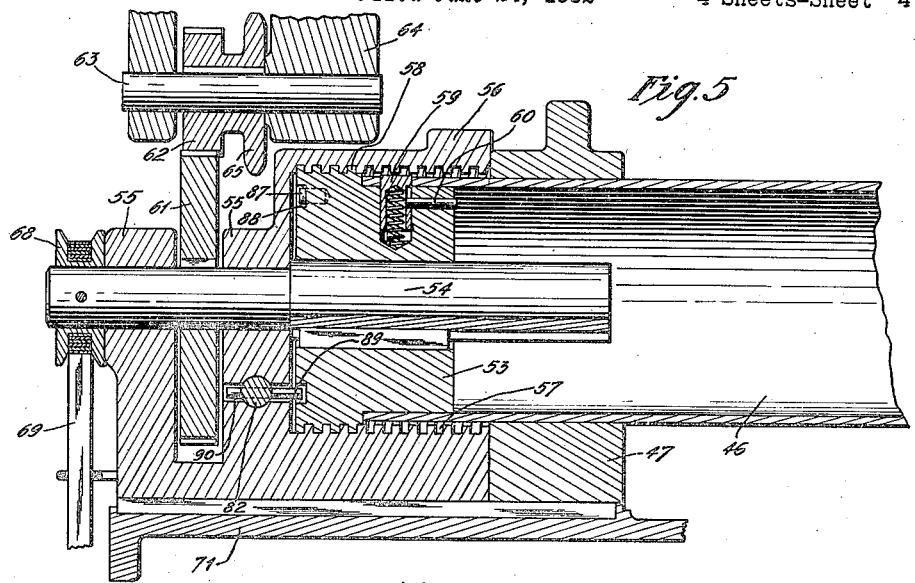
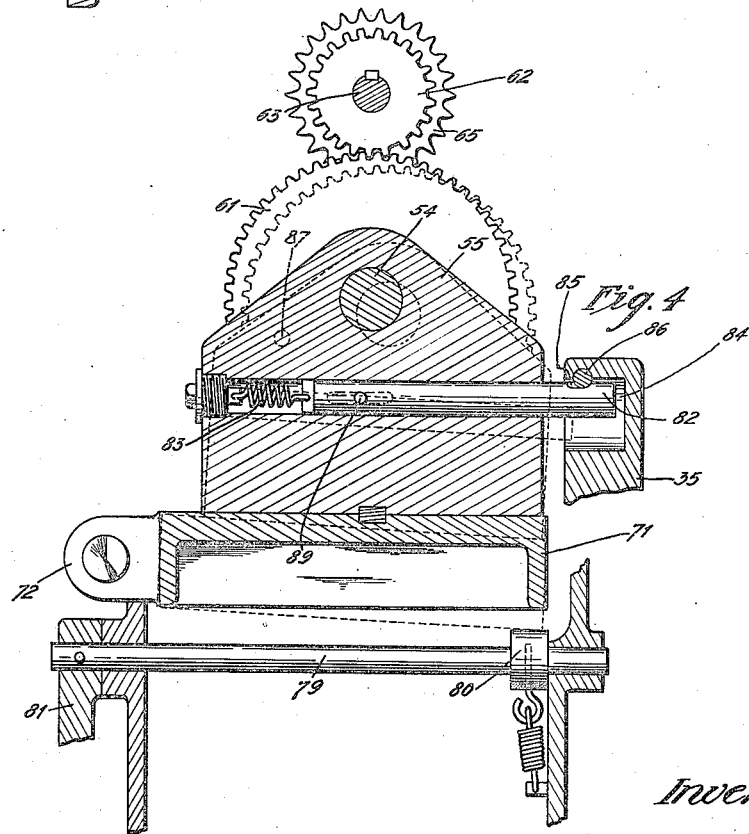
Inventor
Paul F. Schaum
by Orwig & Hague Attys.

Patented Jan. 7, 1936

2,026,850

UNITED STATES PATENT OFFICE 2,026,850

CONTROL DEVICE FOR POWER LAUNDRY WASHERS

Paul Frederick Schaum, Cincinnati, Ohio

Application June 24, 1932, Serial No. 619,092

13 Claims. (Cl. 68—18)

This invention relates to improvements in laundry apparatus of that type adapted to operate power laundry washing machines, and particularly to that type of apparatus adapted to automatically deliver to the washing machine the proper amount of hot and cold water, and other ingredients necessary to complete the washing of a single batch of clothes, whereby the operator need only to fill the machine with soiled clothes, after which the control mechanism is set into operation so that the operator has a considerable amount of time for attending other machines.

Apparatus for this purpose now in commercial use is somewhat objectionable in certain respects due to the fact that the operation of the automatic apparatus requires a certain amount of attention on the part of the operator who generally has to attend to a number of other machines, and often neglects the operation of the controls at the time the operation should be attended to, which results in unsatisfactory and inefficient operation of the mechanism.

The object of my invention is to provide a simple, durable and inexpensive apparatus in which is included means for delivering to the washing machine hot and cold water at the various required temperatures, soda, soap, sour, bluing and other ingredients in liquid form, and improved means for automatically controlling the quantity of the substances delivered to the washing machine, and also the time of their delivery, so that the various ingredients may be delivered in proper sequence as required in the washing operation, or in other words, to automatically carry out the various cycles of operations, or what is commonly known as the program.

A further object is to provide in a laundry apparatus of the type above described a movable program device actuated by the washing machine mechanism in such manner that all of the necessary control devices for admitting fluids to the washing machine are actuated by the one movable member, and during a predetermined amount of movement of said member, whereby a single operation of the program device will cause the predetermined cycle of operations to be automatically carried out, and in connection therewith improved means whereby the said program device cannot be reset for a new cycle of operation until the said program device has been moved to its normal or initial position of movement.

A further object is to provide in connection with a program device of the class above described improved means whereby the program device may be maintained in an inoperative position until it has been reset to its normal position as above described.

A further object is to provide in an automatically operated control mechanism for washing machines a visible means whereby the operating condition of the washing machine may be immediately ascertained by the operator.

A further object is to provide in an automatically operated control device for washing machines improved means for operating the control device whereby the temperature and quantity of water and the proper amounts of other ingredients may be accurately and positively delivered to the washing machine in their proper sequence, as provided for in the predetermined program, whereby all of said operations are positive and absolutely independent of the operator from the beginning to the end of the predetermined sequence of operation.

A further object is to provide in an automatic control device for laundry washing machines employing a movable program device improved means for easily and quickly detaching the program element.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved control device with the supply pipes in section and a portion of the casing broken away.

Figure 2 is a front end view of the mechanism illustrated in Figure 1 as applied to a washing machine tub, said tub being shown in transverse section.

Figure 3 is a back end view of the mechanism illustrated in Figure 1.

Figure 4 is a detail sectional view taken on the line 4—4 of Figure 1.

Figure 5 is an enlarged, detail, sectional view taken on the line 5—5 of Figure 2.

Figure 6 is an enlarged detail sectional view taken on the line 6—6 of Figure 1.

Figure 7 is a sectional view on the line 6—6 of Figure 1 illustrating the program device in its inoperative position.

Figure 8 is a sectional view taken on the line 8—8 of Figure 1.

Figure 9 is a detail sectional view showing the manner in which the valve rod is adjustably connected with its operating lever.

beveled. The member 71 is provided with a slide bolt 75 having its outer end beveled and designed to engage the shoulder 74.

A spring 76 is mounted in the outer end of the shaft 75, to normally hold the inner end of said member 75 into engagement with the shoulder 74. The upper surface of the central portion of the shaft 75 has a notch 77 designed to receive a lug 78 carried by the outer surface of the member 46 at a point intermediate its ends. Thus means is provided whereby when the program member 46 has completed its predetermined automatic movements, and its longitudinal rearward movement the lug 78 will enter the notch 77 as the said member 46 is rotated in a counter-clockwise direction as illustrated in Figure 6. Further rotation of the member 46 will cause the rod 75 to be moved inwardly and to disengage the lug 74 permitting the support 71 to drop to its inoperative position illustrated in Figure 7.

In this connection it should be borne in mind that the program member 46 is being continuously moved longitudinally as it is rotated by the threads 57 and 58, and that the lug 78 will enter the notch 77 only on the last revolution of the member 46.

To return the program support to its normal vertical position I have provided a shaft 79 rotatively mounted in the frame 35 and transversely below the member 71, having a cam 80 on which the inner edge of the member 71 rests when in its inoperative position. Said cam 80 is so arranged that when the shaft 79 is rocked, the member 71 will be elevated, permitting the members 73 and 75 to latch. The shaft 79 is operated by means of a lever 81.

To insure that the program device 46 has been returned to its initial starting position and before the member 71 is permitted to be elevated to operative position, I have provided means whereby the member 71 be locked against upward movement to prevent the latching action of the members 73 and 75 in case said program device has not been moved to its initial and forward position of movement. Said means comprises a shaft 82 slidably mounted in a suitable opening in the inner bearing member 55, as illustrated in Figures 4 and 5. A contractile spring 83 is provided for normally moving the said shaft 82 inwardly.

The outer end of the shaft 82 is designed to be supported in a recess 84 formed in the frame member 35. Said recess is of such depth that the up and down movement of the free edge of the member 71 may take place freely. The upper edge of the outwardly extending portion of the member 82 is provided with a notch 85 for receiving a pin 86 permanently mounted in the recess 84 when the member 82 is at its outer limit of movement, and at which time the frame member 71 is at its upper limit of movement, or operative position, with the members 74 and 75 locked.

It will readily be seen that if the shaft 82 is moved inwardly a slight distance, then the free edge of the frame 71 would not be permitted to be moved to closing position to such an extent that locking action would take place between the members 73 and 75, due to the lower edge of the member 86 contacting the upper edge of the outer end of the member 82 beyond the recess.

The member 82 is moved to its outer limit of movement against the action of the spring 83 by means of a pin 87 carried in the head 53 as the head 53 is rotated in a counter clockwise direction, as illustrated in Figure 4, and at the time the said head 53 and the program device 46 are moved to their forward longitudinal position of movement. This outward movement of the member 82 causes the notch 85 to move to position beneath the pin 86, after which the free edge of the frame 71 may be elevated to position wherein the gears 61 will mesh with the gears 62 in the manner before described.

As soon as power is transmitted to the head 53 to rotate it in a clockwise working direction, the pin 87 will then disengage the pin 89, the member 82 being held against inward movement by means of a pin 86 engaging with the outer shoulder formed by the notch 85. The program device may then be operated until it has been moved to its rearward position of movement, by which time the lug 78 will have engaged the notch 77 of the member 75, causing the latch 75 to disengage the member 73, at which time the program device will again become inoperative.

The program cylinder 46 is provided with one or more cam devices 45 for each of the levers 41, so that upon rotation of the member 46, the valve rods 32 may be actuated in proper sequence to deliver the desired ingredients to the washing machine tub through the inlet pipes before described.

The outlet valve 15 is actuated by means of a link 90 connected to a bell crank 91 which in turn is connected to one end of a vertical link 92 carried by the corresponding lever 34, as illustrated in Figure 8.

The cam 45a is designed to operate the lever 34 in a reverse direction to open the outlet valve 15 from that imparted to levers 34 to open their corresponding valves.

The rear end of the program device 46 is provided with characters or phrases 93 to indicate the working condition of the washing machine, and which of the predetermined programs is being operated, such as suds, bluing, etc. The characters are arranged in such a manner that they will pass under an index member 94 at the time the particular operation indicated is being carried on.

The practical operation of my improved apparatus is as follows:

Assuming that the parts have all been returned to their normal position of movement, and that the washing machine has been emptied and the outlet valve has been moved to a closed position, soiled clothes are then placed in the washing machine, the various liquids may then be admitted automatically according to the predetermined program; such for instance as follows:

|  |  |  |  | Min. |
|---|---|---|---|---|
| 1st—Break | Lukewarm | 90–100° F. | Light suds | 5 |
| 2nd—Suds | Hot water | 130–140° F. | Good suds | 10 |
| 3rd—Suds | Hot water | 160–170° F. | Good suds | 15 |
| 4th—Bleach | Hot water | 160–170° F. | Bleach | 5 |
| 5th—Suds | Hot water | 160–170° F. | Soap | 10 |
| 6th—Rinse | Hot water | 160–170° F. | None | 5 |
| 7th—Rinse | Hot water | 160–170° F. | None | 5 |
| 8th—Rinse | Hot water | 160–170° F. | None | 5 |
| 9th—Rinse | Hot water | 160–170° F. | None | 5 |
| 10th—Sour | Warm water | 130–140° F. | Sour | 5 |
| 11th—Blue | Lukewarm | 90–100° F. | Blue | 5 |

The lever 81 is then grasped, causing the program support 71 to be elevated and locked in operative position. The head 53 will then be rotated by means of the gear 61 from the pinion 62, and at the same time closing the control switch of the motor operating the washing machine. Said switch is mounted in the switch box 95 and actuated by the lever 96 and elevated by a suitable spring not illustrated, at the time the member 71 is elevated.

The said lever 96 is moved to inoperative position by means of a lug 97 carried by the member 71 and engaging the lever 96 at the time the member 71 is moved to inoperative position.

As the said cylinder 46 is rotated, the various ingredients will be delivered to the washing machine through the inlet pipes in the order above indicated. The washing machine is emptied between each of the operations above indicated. The complete washing operation takes place in about seventy-five minutes, and upon about six or seven revolutions of the program device 46.

After the various operations have been completed, the lug 78 engages the shaft 75, permitting the frame 71 to drop to its lowered position of movement, causing the gear 61 to disengage the pinion 62 and the switch arm 96 to be actuated to stop the washing machine. The operator then grasps the handle 70 and causes the shaft 54 to be rotated to return the member 46 to its initial position. This operation continues until the pin 87 engages the pin 89 to place the shaft 82 in position whereby the member 71 may again be moved to its operative position.

By this arrangement it will be seen that the program device cannot again be started until it has first been moved to its initial position, thus providing means whereby the entire program may be carried out when the machine is started. The entire operation is automatic and so arranged that once the machine is started, all of the operations will be completed.

It will further be seen that I have provided a simple, durable and inexpensive mechanism for automatically controlling the program device wherein a uniform quality of work may be performed, resulting in a saving of supplies and time, and wherein the washing formula may be scientifically and positively carried out.

I claim as my invention:

1. In a device of the class described, the combination of a washing machine tub, a series of supply pipes leading into said tub, an outlet pipe, a control valve in each of said pipes, a lever actuated device for controlling each of said valves, a movably mounted program device for actuating said lever devices, and for actuating said valves in predetermined sequence, driving means for actuating said program device, manually actuated supporting means for moving said program device into and out of operative relation with said driving means and said lever devices, means for locking the program supporting means in operative position, and means automatically operated for releasing said locking means when the program device has completed its movement.

2. In a device of the class described, the combination of a washing machine tub, a series of supply pipes leading into said tub, an outlet pipe, a control valve in each of said pipes, a lever actuated device for controlling each of said valves, a movably mounted program device for actuating said lever devices, and for actuating said valves in predetermined sequence, driving means for actuating said program device, manually actuated supporting means for moving said program device into and out of operative relation with said driving means and said lever devices, means for locking the program supporting means in operative position, means automatically operated for releasing said locking means when the program device has completed its movement, and means for returning the program device to its initial position of movement.

3. In a device of the class described, the combination of a washing machine tub, a series of supply pipes leading into said tub, an outlet pipe, a control valve in each of said pipes, a lever actuated device for controlling each of said valves, a movably mounted program device for actuating said lever devices, and for actuating said valves in predetermined sequence, driving means for actuating said program device, manually actuated supporting means for moving said program device into and out of operative relation with said driving means and said lever devices, means for locking the program supporting means in operative position, means automatically operated for releasing said locking means when the program device has completed its movement, means for returning the program device to its normal position of movement, means for locking the program supporting means in an inoperative position, and means actuated by the program device in its returning movement for releasing said locking means only when the program device has returned to its initial position of movement.

4. In a device of the class described, a series of valve actuating devices, a rotatively mounted program device, cams on said device to operate said valve actuating devices in predetermined sequence, means for driving said program device, pivoted means for supporting said program device and for moving said program device into and out of operative relation with said driving means and said valve actuating devices, means for moving the program device to its initial position of movement, means for locking the program supporting means in an inoperative position, and means actuated by the program device in its returning movement for releasing the last said locking means only when the program device has been returned to its initial position of movement.

5. In a device of the class described, a series of valve actuating devices, a movably mounted program supporting device, a program device carried by said supporting device, means on said program device for operating said valve actuating mechanisms in predetermined sequence, said program device being rotatively and detachably mounted in said program support, a driving head rotatively mounted in said program support, and means for detachably connecting said program device to said driving head.

6. In a device of the class described, a series of valve actuating devices, a movably mounted program support, a program device, means carried by said program device for operating said valve actuating devices in predetermined sequence, said program device being rotatively mounted in said program support, a driving head rotatively mounted in said program support, means for detachably connecting said program device to said driving head, means for rotating said driving head, means for moving the program support to cause said head to operatively engage said rotating means, means for returning the program device to its initial position of rotative movement, means for locking the program support in an inoperative position, and means actuated by the program device in its returning movement for releasing the last said locking means only when the program device has returned to its initial position of rotative movement.

7. In a device of the class described, the combination of a series of lever devices for actuating valves, a rotatably mounted cylindrical program device having its circumference provided with a series of cams for engaging said lever devices for actuating the same as the program device is rotated, a pivoted supporting frame adapted to be elevated and lowered, means carried by the frame for rotatively and detachably supporting said program device, a head rotatively mounted on said frame, means for detachably connecting said program device with said head, a spur gear for rotating said head, a driving pinion for imparting movement to said spur gear when the support is at its upper limit of movement with the cams in operative relation with said levers, means for locking said support in its elevated position, means for automatically unlocking said locking means when the program device has completed its operative movement, means for returning the program device to its initial position of movement, means for locking the program supporting means against being completely moved to its upper position of movement, and means for releasing the last said locking means only when the program device has been returned to its initial position of movement.

8. In a device of the class described, a series of valve actuating devices, a movably mounted program support, a program device movably mounted in said program support, cams on said program device for actuating said valve actuating devices as the program device is actuated, means for moving said program device to actuate said valve actuating devices, and means for actuating said program support to move the cams of said program device into and out of operative relation with said actuating devices.

9. In a device of the class described, a series of valve actuating devices, a movably mounted program support, a program device movably mounted on said support, cams on said program device for operating said valve actuating devices in predetermined sequence as the program device is moved, means for moving said program device on the support, and means for actuating the program support and the program carried thereby to cause said cams to be moved into and out of operative relation with the corresponding valve actuating device.

10. In a device of the class described, a series of valve actuating devices, a rotatively mounted program device, cams on said program device to operate said valve actuating devices in predetermined sequence as the program device is rotated in one direction, means for rotating the program device in one direction, means for rotating the program device in the opposite direction, means for movably supporting the program device to permit the cams carried thereon to be moved into and out of operative relation with said valve actuating devices, means for locking the program device in its operative position of movement, and means for automatically releasing said locking means when the program device has completed its operative movement.

11. In a device of the class described, a series of valve actuating devices, a rotatively mounted program device, cams on said program device to operate said valve actuating devices in predetermined sequence as the program device is rotated in one direction, means for rotating said program device in its operative direction, means for rotating the program device in a reverse direction to return it to its initial position, pivoted means for supporting the program device to permit the cams carried thereon to be moved into and out of operative relation with said valve actuating devices, means for locking the program device supporting means in its operative position, means for automatically releasing said locking means when the program device has completed a predetermined number of revolutions, means for locking the program supporting means against being moved to operative position, and means for automatically releasing the last locking means only when the program device has been returned to its initial rotative position of movement.

12. In a device of the class described, the combination of a washing machine tub, a series of supply pipes leading into said tub, an outlet pipe, a control valve in each of said pipes, a lever actuated device for controlling each of said valves, a movably mounted program device for actuating said lever devices and for actuating said valves in predetermined sequence, driving means for actuating said program device, manually actuated supporting means for moving said program device into and out of operative relation with said driving means and said lever devices, and means for locking the program supporting means in operative position.

13. In a device of the class described, a series of valve actuating devices, a program drum having cams for actuating said valve actuating devices in predetermining sequence as the program drum is rotated, said program drum being mounted to move laterally toward and from said valve actuating devices, and means for moving the program drum toward and from said valve actuating devices, for the purpose stated.

PAUL FREDERICK SCHAUM.